(12) United States Patent
Takahashi et al.

(10) Patent No.: US 8,625,254 B2
(45) Date of Patent: Jan. 7, 2014

(54) SOLID ELECTROLYTIC CAPACITOR WITH SMALL LEAKAGE CURRENT AND METHOD OF MANUFACTURING THE SAME

(75) Inventors: Naoki Takahashi, Sendai (JP);
Toshihiko Nishiyama, Sendai (JP);
Satoshi Suzuki, Sendai (JP); Ryuta Kobayakawa, Sendai (JP); Tomoki Nobuta, Sendai (JP)

(73) Assignee: NEC Tokin Corporation, Tokyo (JP)

( * ) Notice: Subject to any disclaimer, the term of this patent is extended or adjusted under 35 U.S.C. 154(b) by 162 days.

(21) Appl. No.: 13/236,196

(22) Filed: Sep. 19, 2011

(65) Prior Publication Data
US 2012/0002350 A1 Jan. 5, 2012

Related U.S. Application Data

(62) Division of application No. 12/262,295, filed on Oct. 31, 2008, now Pat. No. 8,038,738.

(30) Foreign Application Priority Data

Nov. 6, 2007 (JP) ................................ 2007-288486

(51) Int. Cl.
*H01G 9/00* (2006.01)
*H01G 9/145* (2006.01)

(52) U.S. Cl.
USPC .......................................... 361/523; 361/528

(58) Field of Classification Search
None
See application file for complete search history.

(56) References Cited

U.S. PATENT DOCUMENTS

| 4,805,074 A * | 2/1989 | Harakawa et al. ............ 361/525 |
| 6,320,742 B1 | 11/2001 | Wada et al. |
| 6,665,172 B1 * | 12/2003 | Kim et al. ..................... 361/523 |
| 7,292,432 B2 * | 11/2007 | Furuzawa et al. ............. 361/523 |
| 7,554,793 B2 * | 6/2009 | Chacko ......................... 361/525 |
| 2005/0073818 A1 | 4/2005 | Hirano et al. |
| 2005/0233194 A1 * | 10/2005 | Suenaga et al. ................. 429/30 |
| 2007/0230091 A1 | 10/2007 | Kobayashi |
| 2009/0310283 A1 * | 12/2009 | Kim et al. ..................... 361/523 |

FOREIGN PATENT DOCUMENTS

| JP | 2940059 B2 | 8/1999 |
| JP | 2000-243665 A | 9/2000 |

* cited by examiner

*Primary Examiner* — Jayprakash N Gandhi
*Assistant Examiner* — Dion Ferguson
(74) *Attorney, Agent, or Firm* — Holtz, Holtz, Goodman & Chick, PC

(57) ABSTRACT

A solid electrolytic capacitor includes an anode formed of a valve metal and having a roughened surface layer at a surface thereof, a dielectric layer formed of a valve metal oxide and formed on the anode, a cathode formed of a conductive polymer layer formed on the dielectric layer, an anode lead formed adjacent to and integrally with the anode, and a resist formed of an insulating material and delimiting the anode and the anode lead. The anode and the anode lead have a first stepped portion having both surfaces each cut in a thickness direction and covered with the resist, and the anode lead has a second stepped portion having both surfaces each cut deeper in the thickness direction than the first stepped portion.

5 Claims, 5 Drawing Sheets

SOLID ELECTROLYTIC CAPACITOR WITH SMALL LEAKAGE CURRENT AND METHOD OF MANUFACTURING THE SAME

This is a Divisional of U.S. application Ser. No. 12/262,295, filed Oct. 31, 2008 now U.S. Pat. No. 8,038,738, which application is based upon and claims the benefit of priority from Japanese patent application No. 2007-288486, filed Nov. 6, 2007, the entire contents of both of which are incorporated herein by reference.

BACKGROUND ART

This invention relates to a solid electrolytic capacitor and a manufacturing method thereof.

Following the digitization, miniaturization, and speed-up of electronic devices in recent years, there has been an increasing demand for capacitors for use in electronic devices that are small in size, large in capacitance, and low in impedance in a high-frequency band.

As a capacitor that can respond to such a demand, there is a solid electrolytic capacitor having a conductive polymer layer (solid electrolyte layer).

This type of solid electrolytic capacitor is disclosed, for example, in Japanese Patent (JP-B) No. 2940059 (first related-art document). Referring to FIG. 1 illustrating a solid electrolytic capacitor similar to that disclosed in the first related-art document, the solid electrolytic capacitor comprises an anode (61) formed by a proximal portion 61 of a metal member 60 made of a valve metal, a dielectric layer (not illustrated) in the form of a valve metal oxide film formed at the surfaces of the anode 61, a cathode (80) in the form of a conductive polymer layer 80 formed on the anode 61 through the dielectric layer, and an anode lead (63) formed by a distal portion 63 of the metal member 60. In the figure, symbol 90 denotes a later-described resist.

The conductive polymer layer 80 is formed by immersing the proximal portion 61 of the metal member 60 in a monomer solution containing, for example, a derivative of pyrrole or a derivative of thiophene and a supporting electrolyte to thereby carry out electrolytic polymerization, chemical polymerization, or the like.

Herein, as disclosed in the first related-art document, the tape-like resist 90 is formed at an intermediate portion 62 between the proximal portion 61, which will serve as the anode 61, and the distal portion 63, which will serve as the anode lead 63, of the metal member 60. The resist 90 serves to prevent penetration of the monomer solution to the distal portion 63 of the metal member 60 while the proximal portion 61 of the metal member 60 is immersed in the monomer solution. The reason for preventing the penetration of the monomer solution to the distal portion 63 is to prevent occurrence of a leakage current between the cathode 80 and the anode lead 63 due to formation of a film of a conductive polymer contained in the monomer solution on the surfaces of the anode lead 63 when the solid electrolytic capacitor is completed.

However, the metal member 60 has a roughened surface layer 60a in order to obtain a large capacitance by increasing the facing area between the anode 61 and the cathode 80. Therefore, there is a possibility that gaps exist between the roughened surface layer 60a at the intermediate portion 62 of the metal member 60 and the tape-like resist 90. Consequently, there is a possibility that when the proximal portion 61 of the metal member 60 is immersed in the monomer solution, the monomer solution penetrates to the distal portion 63 of the metal member 60.

On the other hand, Japanese Unexamined Patent Application Publication (JP-A) No. 2000-243665 (second related-art document) discloses a measure for preventing the penetration of a monomer solution more securely than that disclosed in the first related-art document. This measure is, namely, a forbidden band formed on the surfaces of an intermediate portion of a metal member between its proximal portion to serve as an anode and its distal portion to serve as an anode lead. As one example of this forbidden band, the second related-art document teaches a combination of a separation groove formed by partly removing a roughened surface layer of the metal member so as to expose the body of the metal member and a resist formed on the separation groove.

However, even with the combination of the separation groove and the resist disclosed in the second related-art document, there is a possibility that the monomer solution penetrates to the distal portion of the metal member through minute gaps between the surface of the separation groove and the resist.

Further, there is also a possibility that the monomer solution creeps up the surface of the resist to reach the distal portion of the metal member. The creeping-up of the monomer solution remarkably occurs when immersing the metal member in the monomer solution so as to exceed the proximal portion thereof.

Herein, if the separation groove and the resist are prolonged, it may be more difficult for the monomer solution to penetrate or creep up. However, as a result of prolonging the separation groove and the resist, the redundant intermediate portion that does not serve either as the anode or as the anode lead is enlarged in the metal member. This is not preferable because it leads to an unnecessary increase in size of a solid electrolytic capacitor, that is, to a reduction in volumetric efficiency of a solid electrolytic capacitor.

DISCLOSURE OF THE INVENTION

It is an object of this invention to solve the above problems and to provide a solid electrolytic capacitor with a small leakage current and yet with excellent volumetric efficiency and a method of manufacturing such a solid electrolytic capacitor.

According to an aspect of this invention, there is provided a solid electrolytic capacitor manufacturing method comprising the steps of forming a roughened surface layer at a surface of a metal member made of a valve metal and having a proximal portion, a distal portion, and an intermediate portion between the proximal portion and the distal portion, forming a valve metal oxide film at a surface of the roughened surface layer, removing the roughened surface layer from the distal portion of the metal member and from part of the intermediate portion adjacent to the distal portion, forming a resist on the distal portion and the intermediate portion of the metal member, forming a conductive polymer layer of a conductive polymer on the proximal portion of the metal member, and removing the resist and a surface layer portion of the metal member from the distal portion of the metal member, whereby forming an anode formed by the proximal portion of the metal member, a cathode formed by the conductive polymer layer and facing the anode, a dielectric layer formed by the valve metal oxide film and interposed between the anode and the cathode, and an anode lead formed by the distal portion of the metal member.

The distal portion and the intermediate portion of the metal member may be arranged at each of both ends of the proximal portion, so that the anode lead includes a first anode lead and a second anode lead.

According to another aspect of this invention, there is provided a solid electrolytic capacitor manufactured by the solid electrolytic capacitor manufacturing method.

According to still another aspect of this invention, there is provided a solid electrolytic capacitor comprising an anode made of a valve metal and having a roughened surface layer at a surface thereof, a dielectric layer made of a valve metal oxide and formed on the anode, a cathode in the form of a conductive polymer layer formed on the dielectric layer, an anode lead formed adjacent to and integrally with the anode, and a resist made of an insulating material and delimiting the anode and the anode lead. The anode and the anode lead have a first stepped portion having both surfaces each cut in a thickness direction and covered with the resist. The anode lead has a second stepped portion having both surfaces each cut deeper in the thickness direction than the first stepped portion.

DESCRIPTION OF THE EXEMPLARY EMBODIMENTS

A solid electrolytic capacitor manufacturing method according to this invention includes at least the following processes:

Note that a metal member has a proximal portion, a distal portion, and an intermediate portion between the proximal portion and the distal portion.

Process of forming a roughened surface layer at a surface of the metal member made of a valve metal;

Process of forming a valve metal oxide film at a surface of the roughened surface layer;

Process of removing the roughened surface layer from the distal portion of the metal member and from part of the intermediate portion adjacent to the distal portion;

Process of forming a resist on the distal portion and the intermediate portion of the metal member;

Process of forming a conductive polymer layer of a conductive polymer on the proximal portion of the metal member; and Process of removing the resist and a surface layer portion of the metal member from the distal portion of the metal member.

Through the above processes, there are formed an anode formed by the proximal portion of the metal member, a cathode formed by the conductive polymer layer and facing the anode, a dielectric layer formed by the valve metal oxide film and interposed between the anode and the cathode, and an anode lead formed by the distal portion of the metal member.

First Embodiment

Hereinbelow, a description will be given of a solid electrolytic capacitor manufacturing method according to a first embodiment of this invention.

Figure 2A:
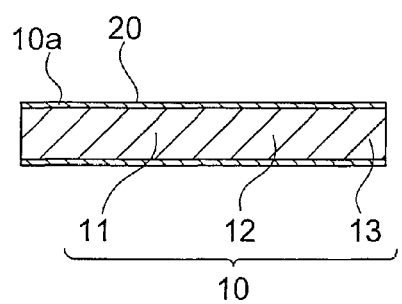
FIGS. 2A to 2E are sectional views for explaining a solid electrolytic capacitor manufacturing method according to a first embodiment of this invention.

At first, as illustrated in FIG. 2A, an aluminum foil is prepared as a metal member 10 made of a valve metal.

The valve metal may be, instead of aluminum, one of tantalum, niobium, zirconium, titanium, a complex of at least two of these valve metals, and an alloy of at least two of these valve metals. The metal member 10 may be in the form of a plate or a wire instead of the foil.

A roughened surface layer 10a is formed at the surfaces of the metal member 10. The roughened surface layer 10a is formed by electrolytic etching of the surfaces of the metal member 10. The roughened surface layer 10a may be formed by adhesion of valve metal powder to the surfaces of the metal member 10.

The metal member 10 has a proximal portion 11, a distal portion 13, and an intermediate portion 12 between the proximal portion 11 and the distal portion 13.

Further, an aluminum oxide film is formed as a valve metal oxide film 20 at the surfaces of the roughened surface layer 10a.

The aluminum oxide film is formed by immersing the aluminum foil in an electrolyte maintained at a predetermined temperature, applying a predetermined voltage thereto, and maintaining the state for a predetermined time. This process is also called anodic oxidation.

Figure 2D:
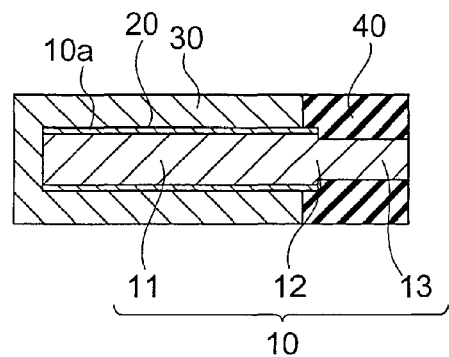
Figure 2B:
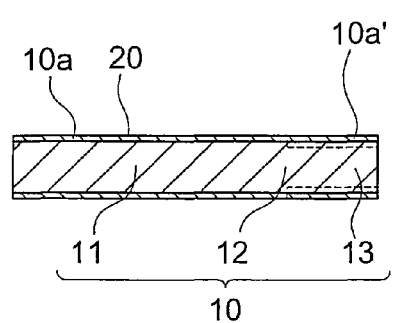

Then, as shown by broken lines in FIG. 2B, a roughened surface layer 10a', i.e. part of the roughened surface layer 10a, is removed from the distal portion 13 of the metal member 10 and from part of the intermediate portion 12 adjacent to the distal portion 13.

What is noteworthy in this invention is that the roughened surface layer is removed not only at the intermediate portion of the metal member, but is removed both at part of the intermediate portion and at the distal portion.

The roughened surface layer 10a is removed by laser cutting. The roughened surface layer 10a may be removed by mechanical cutting by the use of a router or the like, instead of the laser cutting.

Figure 2E:
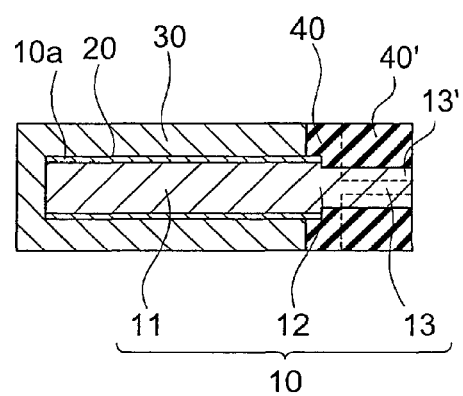
Figure 2C:
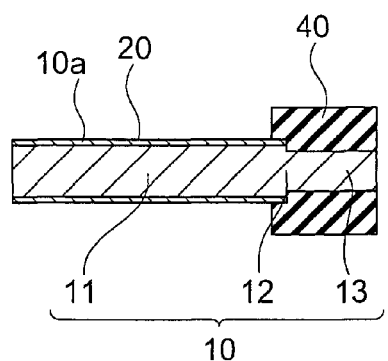

Next, as illustrated in FIG. 2C, a resist 40 is formed on the distal portion 13 and the intermediate portion 12 of the metal member 10.

What is noteworthy in this invention is that the resist is formed not only at the intermediate portion of the metal member, but is formed both at the intermediate portion and at the distal portion.

The resist 40 is formed by coating a fluid silicone agent by screen printing and then curing it. The resist 40 may be formed by bonding a silicone tape, instead of coating the silicone agent. Alternatively, the resist 40 may be formed by coating an electrically insulating thermosetting or thermoplastic resin by screen printing and then curing it. The thermosetting resin and the thermoplastic resin are, for example, an epoxy resin and a polyester-based resin, respectively.

Then, as illustrated in FIG. 2D, a conductive polymer layer 30 of a conductive polymer is formed on the proximal portion 11 of the metal member 10.

The conductive polymer layer 30 is formed by a chemical polymerization method, an electrolytic polymerization method, or a solution immersion method. These forming methods each include a process of immersing part or the whole of the metal member 10, including at least the proximal portion 11, in a monomer solution containing a derivative and a supporting electrolyte.

The conductive polymer is formed by adding one of an electron acceptor and an electron donor to one of polyacetylene, polyparaphenylene, polyaniline, polythiophene, polyparaphenylenevinylene, polypyrrole, and derivatives of these conductive polymers.

Note that the monomer solution may have penetrated to the distal portion 13 of the metal member 10 through minute gaps between the intermediate portion 12 and the resist 40 or may have crept up the surfaces of the resist 40.

Then, as shown by broken lines in FIG. 2E, a resist 40', i.e. part of the resist 40, and surface layer portions 13' of the metal member 10 are removed from the distal portion 13 of the metal member 10.

The resist 40 formed on the distal portion 13 and the surface layer portions 13' of the distal portion 13 are removed by laser cutting. Although the removal of these portions can also be performed by mechanical cutting by the use of a router or the like, the laser cutting is preferable because precise removal dimensions are required.

What is noteworthy in this invention is that the conductive polymer caused by the monomer solution having penetrated or crept up near the distal portion 13 of the metal member 10 is completely removed and thus the surfaces of the distal portion 13 are perfectly pure.

Figure 3:
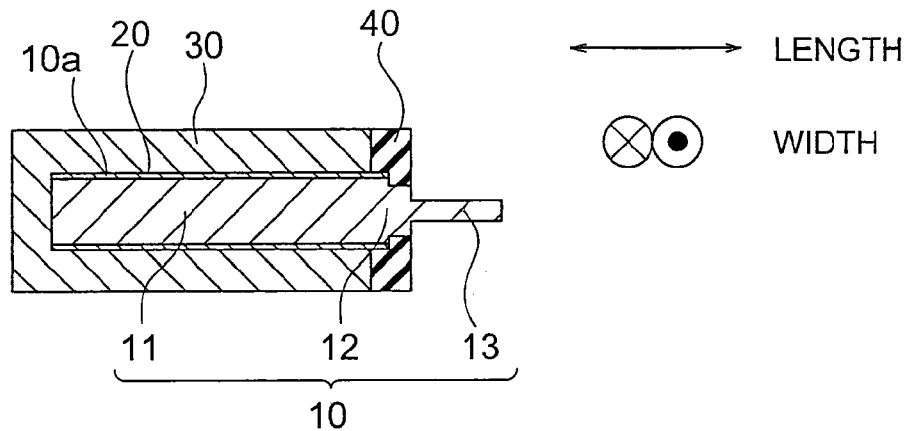
FIG. 3 is a sectional view illustrating a main portion of a two-terminal type solid electrolytic capacitor according to the first embodiment of this invention.

In the manner described above, a two-terminal type solid electrolytic capacitor element illustrated in FIG. 3 is manufactured. This solid electrolytic capacitor element comprises an anode (11) formed by the proximal portion 11 of the metal member 10, a cathode (30) formed by the conductive polymer layer 30 and facing the anode 11, a dielectric layer (20) formed by the valve metal oxide film 20 and interposed between the anode 11 and the cathode 30, and an anode lead (13) formed by the distal portion 13 of the metal member 10.

Figure 4:
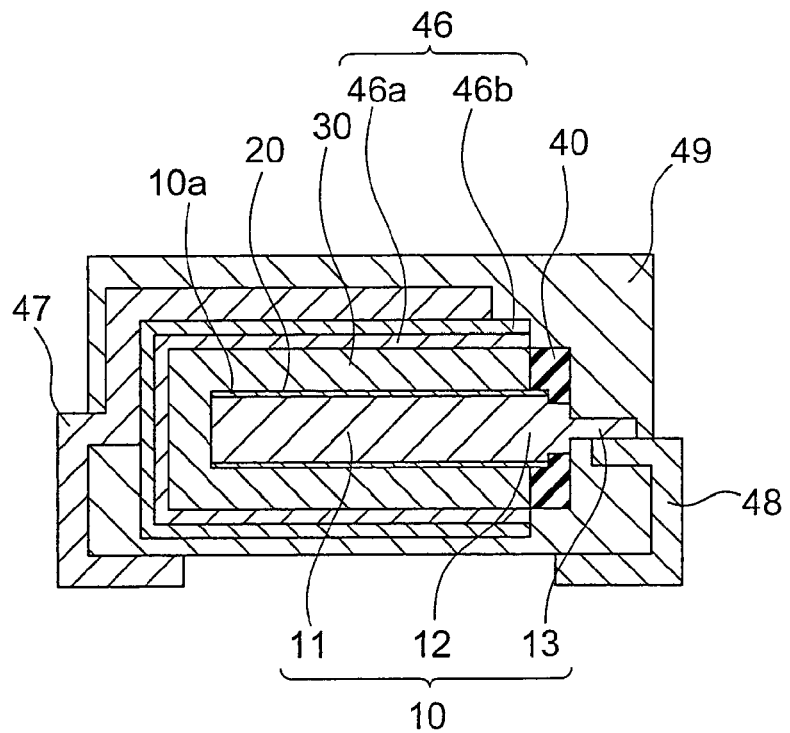
FIG. 4 is a sectional view illustrating the two-terminal type solid electrolytic capacitor according to the first embodiment of this invention.

Further, referring to FIG. 4, a cathode lead layer 46 formed of a graphite layer 46a and a silver layer 46b is further formed on the cathode 30 of this solid electrolytic capacitor element. If necessary, an anode terminal 48 and a cathode terminal 47 are respectively bonded to the anode lead 13 and the cathode lead layer 46 of this solid electrolytic capacitor element. Further, this solid electrolytic capacitor element, except part of the anode terminal 48 and part of the cathode terminal 47, is incorporated in a package 49 made of an epoxy resin or the like, so that a solid electrolytic capacitor is completed.

A solid electrolytic capacitor according to this invention may be not only a solid electrolytic capacitor incorporating a single solid electrolytic capacitor element as described above, but also a stacked solid electrolytic capacitor incorporating a plurality of stacked solid electrolytic capacitor elements.

Second Embodiment

A solid electrolytic capacitor manufacturing method according to a second embodiment of this invention is a method of manufacturing a three-terminal type solid electrolytic capacitor. Hereinbelow, a detailed description of the processes the same as or similar to those in the first embodiment will be omitted.

Figure 5A:
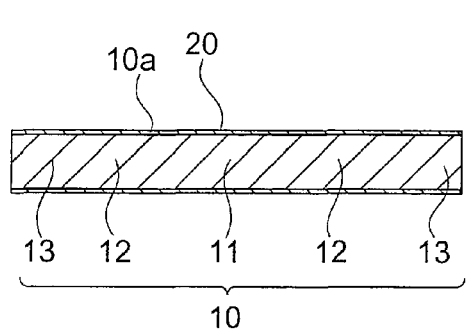
FIGS. 5A to 5E are sectional views for explaining a solid electrolytic capacitor manufacturing method according to a second embodiment of this invention.

At first, as illustrated in FIG. 5A, an aluminum foil is prepared as a metal member 10 made of a valve metal. A roughened surface layer 10a is formed at the surfaces of the metal member 10. The metal member 10 has a proximal portion 11, two distal portions 13, and two intermediate portions 12 each between the proximal portion 11 and the corresponding distal portion 13. Further, an aluminum oxide film is formed as a valve metal oxide film 20 at the surfaces of the roughened surface layer 10a.

Figure 5B:
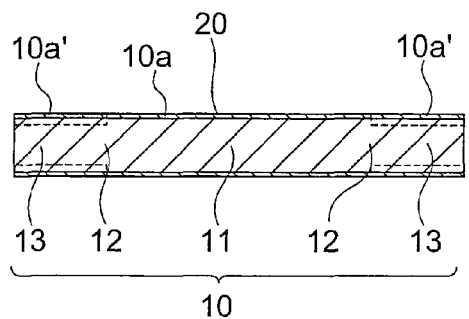

Then, as shown by broken lines in FIG. 5B, a roughened surface layer 10a' is removed from each distal portion 13 of the metal member 10 and from part of each intermediate portion 12 adjacent to the corresponding distal portion 13. What is noteworthy is that the roughened surface layer is removed not only at each intermediate portion of the metal member, but is removed both at part of each intermediate portion and at each distal portion.

Figure 5C:
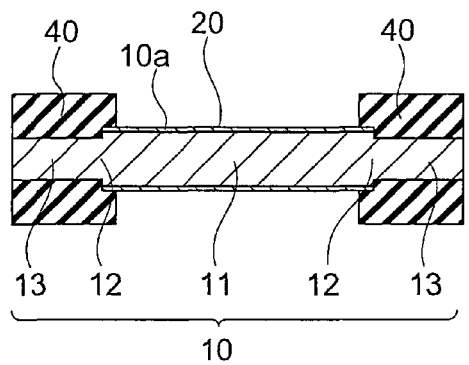

Next, as illustrated in FIG. 5C, a resist 40 is formed on each distal portion 13 and each intermediate portion 12 of the metal member 10. What is noteworthy is that the resist is formed not only at each intermediate portion of the metal member, but is formed both at each intermediate portion and at each distal portion.

Figure 5D:
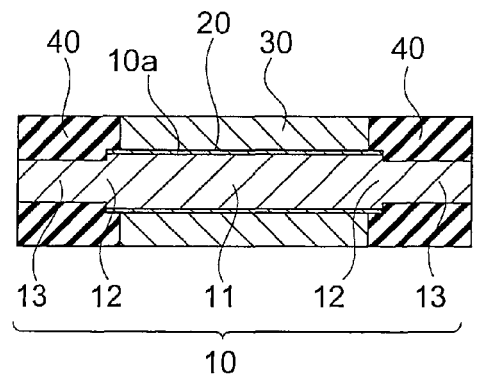

Then, as illustrated in FIG. 5D, a conductive polymer layer 30 of a conductive polymer is formed on the proximal portion 11 of the metal member 10. The formation of the conductive polymer layer 30 includes a process of immersing the entire metal member 10 in a monomer solution containing a derivative and a supporting electrolyte. Note that the monomer solution may have penetrated to the distal portions 13 of the metal member 10 through minute gaps between the intermediate portions 12 and the resists 40 or may have crept up the surfaces of the resists 40.

Figure 5E:
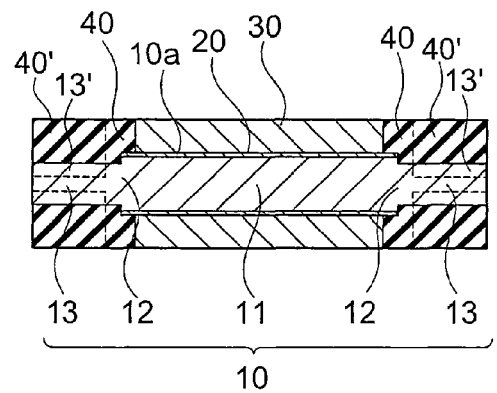

Then, as shown by broken lines in FIG. 5E, a resist 40' and surface layer portions 13' of the metal member 10 are removed from each distal portion 13 of the metal member 10. What is noteworthy is that the conductive polymer caused by the monomer solution having penetrated or crept up near the distal portions 13 of the metal member 10 is completely removed and thus the surfaces of the distal portions 13 are perfectly pure.

Figure 6:
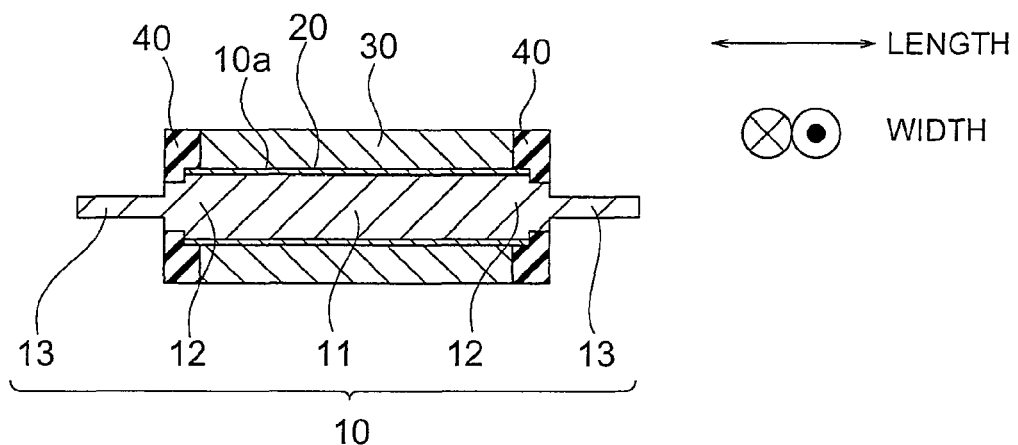
FIG. 6 is a sectional view illustrating a main portion of a three-terminal type solid electrolytic capacitor according to the second embodiment of this invention.

In the manner described above, a three-terminal type solid electrolytic capacitor element illustrated in FIG. 6 is manufactured. This solid electrolytic capacitor element comprises an anode (11) formed by the proximal portion 11 of the metal member 10, a cathode (30) formed by the conductive polymer layer 30 and facing the anode 11, a dielectric layer (20) formed by the valve metal oxide film 20 and interposed between the anode 11 and the cathode 30, and two anode leads (13) formed by the two distal portions 13 of the metal member 10.

Figure 7:
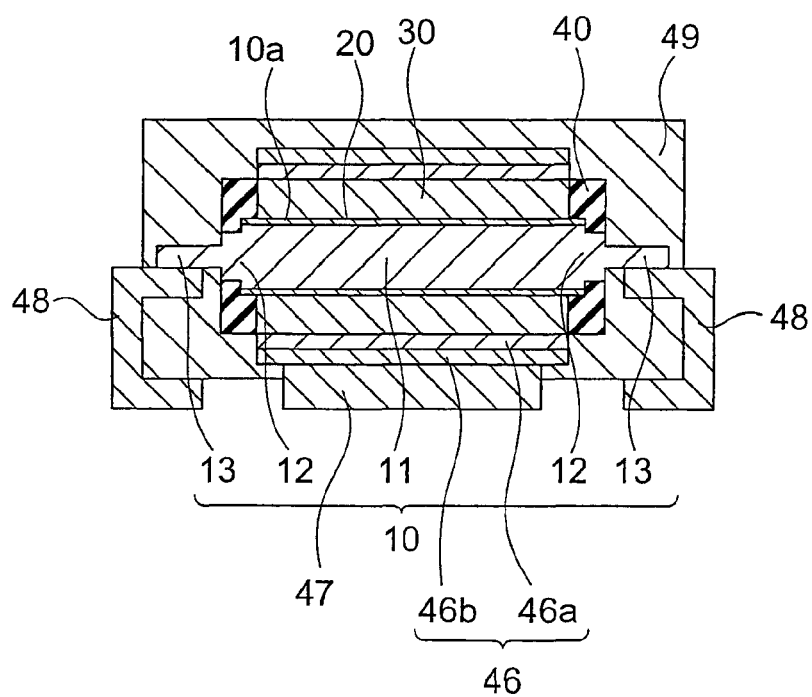
FIG. 7 is a sectional view illustrating the three-terminal type solid electrolytic capacitor according to the second embodiment of this invention.

Further, referring to FIG. 7, a cathode lead layer 46 formed of a graphite layer 46a and a silver layer 46b is further formed on the cathode 30 of this solid electrolytic capacitor element. If necessary, anode terminals 48 and a cathode terminal 47 are respectively bonded to the anode leads 13 and the cathode lead layer 46 of this solid electrolytic capacitor element. Further, this solid electrolytic capacitor element, except part of each anode terminal 48 and part of the cathode terminal 47, is incorporated in a package 49 made of an epoxy resin or the like, so that a solid electrolytic capacitor is completed.

A solid electrolytic capacitor according to this invention may be not only a solid electrolytic capacitor incorporating a single solid electrolytic capacitor element as described above, but also a stacked solid electrolytic capacitor incorporating a plurality of stacked solid electrolytic capacitor elements.

Performance Test

Next, there are shown results of a performance test conducted for manufactured solid electrolytic capacitors (solid electrolytic capacitor elements).

At first, tested samples 1 to 5 will be explained.

Sample 1:

This is a two-terminal type solid electrolytic capacitor element according to the first embodiment of this invention illustrated in FIG. 3. An aluminum foil as a metal member 10 has a size of width 3 mm×length 4 mm×thickness 100 μm and has a roughened surface layer 10a formed by etching to a depth of 20 μm on each main surface of the aluminum foil. A roughened surface layer 10a' removed from a distal portion 13 of the aluminum foil and from part of an intermediate portion 12 adjacent to the distal portion 13 as illustrated in FIG. 2B has a size of width 3 mm×length 0.85 mm×thickness 20 μm on each main surface of the aluminum foil. A resist 40 formed on the distal portion 13 and the intermediate portion 12 of the aluminum foil as illustrated in FIG. 2C has a size of width 3 mm×length 1 mm on each main surface of the aluminum foil. A surface layer portion 13' of the metal member 10, removed along with a resist 40' from the distal portion 13 of the aluminum foil as illustrated in FIG. 2E, has a size of width 3 mm×length 0.75 mm×thickness 10 μm on each main surface of the aluminum foil. That is, the resist 40 remaining on the intermediate portion 12 of the aluminum foil has a size of width 3 mm×length 0.25 mm on each main surface of the aluminum foil.

Sample 2:

This is a three-terminal type solid electrolytic capacitor element according to the second embodiment of this invention illustrated in FIG. 6. An aluminum foil as a metal member 10 has a size of width 3 mm×length 5 mm×thickness 100 μm and has a roughened surface layer 10a formed by etching to a depth of 20 μm on each main surface of the aluminum foil. A roughened surface layer 10a' removed from each distal portion 13 of the aluminum foil and from part of each intermediate portion 12 adjacent to the corresponding distal portion 13 as illustrated in FIG. 5B has a size of width 3 mm×length 0.85 mm×thickness 20 μm on each main surface of the aluminum foil. A resist 40 formed on each distal portion 13 and each intermediate portion 12 of the aluminum foil as illustrated in FIG. 5C has a size of width 3 mm×length 1 mm on each main surface of the aluminum foil. A surface layer portion 13' of the metal member 10, removed along with a resist 40' from each distal portion 13 of the aluminum foil as illustrated in FIG. 5E, has a size of width 3 mm×length 0.75 mm×thickness 10 μm on each main surface of the aluminum foil. That is, the resist 40 remaining on each intermediate portion 12 of the aluminum foil has a size of width 3 mm×length 0.25 mm on each main surface of the aluminum foil.

Figure 1:
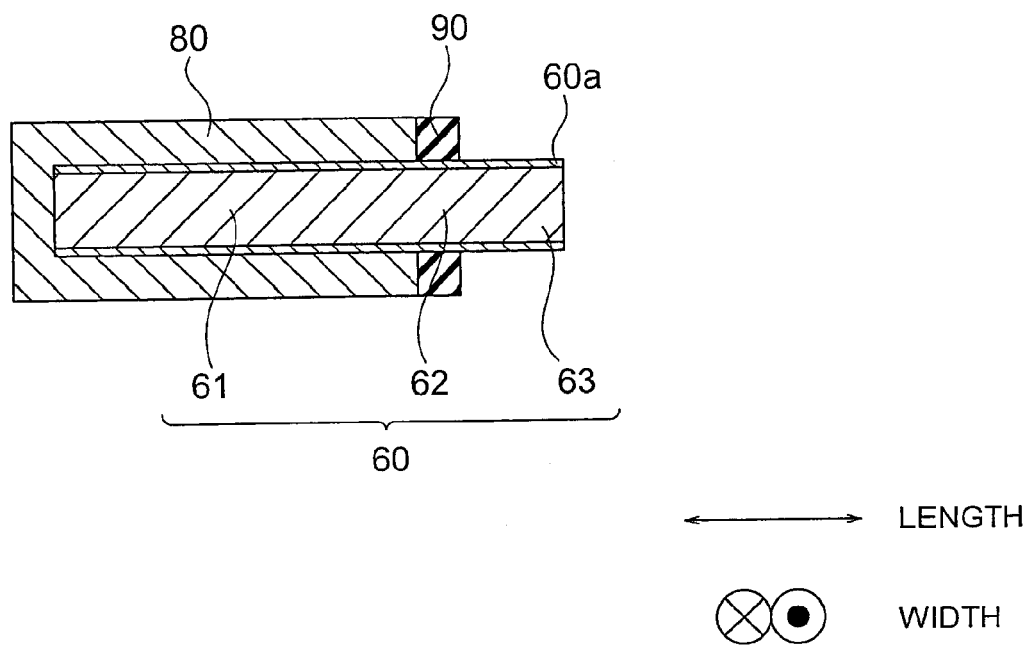
FIG. 1 is a sectional view illustrating a main portion of a solid electrolytic capacitor of a related art of this invention.

Sample 3:

This is a first comparative example and is a two-terminal type solid electrolytic capacitor element of the related art illustrated in FIG. 1. An aluminum foil as a metal member 60 has a size of width 3 mm×length 4 mm×thickness 100 μm and has a roughened surface layer formed by etching to a depth of 20 μm on each main surface of the aluminum foil. A resist 90 formed on an intermediate portion 62 of the aluminum foil has a size of width 3 mm×length 0.25 mm on each main surface of the aluminum foil. On the other hand, a distal portion 63 of the aluminum foil has a size of width 3 mm×length 0.75 mm.

Sample 4:

This is a second comparative example and is a modification of the two-terminal type solid electrolytic capacitor element of the related art illustrated in FIG. 1. An aluminum foil as a metal member 60 has a size of width 3 mm×length 4.75 mm×thickness 100 μm and has a roughened surface layer formed by etching to a depth of 20 μm on each main surface of the aluminum foil. A resist 90 formed on an intermediate portion 62 of the aluminum foil has a size of width 3 mm×length 1 mm on each main surface of the aluminum foil. On the other hand, a distal portion 63 of the aluminum foil has a size of width 3 mm×length 0.75 mm.

Sample 5:

This is a third comparative example and is a three-terminal type solid electrolytic capacitor element of a related art. An aluminum foil as a metal member has a size of width 3 mm×length 5 mm×thickness 100 μm and has a roughened surface layer formed by etching to a depth of 20 μm on each main surface of the aluminum foil. A resist formed on each of two intermediate portions of the aluminum foil has a size of width 3 mm×length 0.25 mm on each main surface of the aluminum foil. On the other hand, two distal portions of the aluminum foil each have a size of width 3 mm×length 0.75 mm.

Leakage current between the cathode and the anode lead was measured with respect to Samples 1 and 2 of this invention and Samples 3 to 5 of the related arts. The results are shown in a table below. The table also shows, for each sample, a volumetric efficiency representing a ratio (%) of a volume of a portion contributing to capacitance to a volume of the entire solid electrolytic capacitor element.

TABLE

Leakage Current and Volumetric Efficiency of Solid Electrolytic Capacitor Element

|  | Sample | Number of Terminals | Leakage Current [μA] | Volumetric Efficiency [%] |
|---|---|---|---|---|
| This Invention | 1 | 2 | 0.32 | 75 |
|  | 2 | 3 | 0.27 | 50 |
| Comparative Example | 3 | 2 | 2.21 | 75 |
|  | 4 | 2 | 0.51 | 56 |
|  | 5 | 3 | Short | 50 |

As is clear from the table, with respect to the two-terminal type solid electrolytic capacitor elements achieving the same volumetric efficiency of 75%, Sample 1 (first embodiment of this invention) is smaller in leakage current as compared with Sample 3 (comparative example). On the other hand, with respect to the two-terminal type solid electrolytic capacitor elements exhibiting similar leakage currents, Sample 1 (first embodiment of this invention) is excellent in volumetric efficiency as compared with Sample 4 (comparative example). In this manner, this invention accomplishes both the small leakage current and the excellent volumetric efficiency.

Further, with respect to the three-terminal type solid electrolytic capacitor elements, Sample 2 (second embodiment of this invention) is small in leakage current, while, Sample 5 (comparative example) fails due to a short circuit between the cathode and the anode lead and thus cannot be put to practical use.

It is needless to say that this invention is not limited to the embodiments described above and various changes can be made within a technical scope described in the claims.

What is claimed is:

1. A solid electrolytic capacitor comprising:

an anode comprising a valve metal and having a roughened surface layer at a surface thereof;

a dielectric layer comprising a valve metal oxide and formed on said anode;

a cathode comprising a conductive polymer layer formed on said dielectric layer;

an anode lead formed adjacent to and integrally with said anode; and a resist comprising an insulating material and delimiting said anode and said anode lead;

wherein said anode lead has a first stepped portion having first and second surfaces each cut in a thickness direction, and a second stepped portion having first and second surfaces each cut deeper in the thickness direction than said first stepped portion;

wherein said resist covers said first stepped portion of said anode lead; and wherein said resist further covers an end portion of said anode adjacent to said anode lead through said dielectric layer.

2. A solid electrolytic capacitor comprising:

an anode comprising a valve metal and having a roughened surface layer at a surface thereof;

a dielectric layer comprising a valve metal oxide and formed on said anode;

a cathode comprising a conductive polymer layer formed on said dielectric layer;

an anode lead formed adjacent to and integrally with said anode; and a resist comprising an insulating material and delimiting said anode and said anode lead;

wherein said anode lead has a first stepped portion having first and second surfaces each cut in a thickness direction, and a second stepped portion having first and second surfaces each cut deeper in the thickness direction than said first stepped portion;

wherein said resist covers said first stepped portion of said anode lead, and not said second stepped portion of said anode lead; and wherein said resist further covers an end portion of said anode adjacent to said anode lead through said dielectric layer.

3. The solid electrolytic capacitor according to claim 2, wherein said resist does not cover the anode at a portion other than said end portion.

4. A solid electrolytic capacitor comprising:

an anode comprising a valve metal and having a roughened surface layer at a surface thereof;

a dielectric layer comprising a valve metal oxide and formed on said anode;

a cathode comprising a conductive polymer layer formed on said dielectric layer;

an anode lead formed adjacent to and integrally with said anode; and a resist comprising an insulating material and delimiting said anode and said anode lead;

wherein said anode lead has a first stepped portion having first and second surfaces each cut in a thickness direction, and a second stepped portion having first and second surfaces each cut deeper in the thickness direction than said first stepped portion;

wherein said resist covers said first stepped portion of said anode lead; and wherein said resist further covers an end portion of said anode adjacent to said anode lead through said dielectric layer, and said resist does not cover the anode at a portion other than the end portion.

5. The solid electrolytic capacitor according to claim 4, wherein said resist covers said first stepped portion of said anode lead, and not said second stepped portion of said anode lead.

* * * * *